United States Patent
Kuper

(10) Patent No.: US 10,061,556 B2
(45) Date of Patent: Aug. 28, 2018

(54) AUDIO SETTINGS

(71) Applicant: Sonos, Inc., Santa Barbara, CA (US)

(72) Inventor: Ron Kuper, Arlington, MA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

(21) Appl. No.: 15/149,683

(22) Filed: May 9, 2016

(65) Prior Publication Data
US 2016/0253147 A1 Sep. 1, 2016

Related U.S. Application Data

(63) Continuation of application No. 14/337,770, filed on Jul. 22, 2014, now Pat. No. 9,367,283.

(51) Int. Cl.
*G06F 17/00* (2006.01)
*G06F 3/16* (2006.01)
(Continued)

(52) U.S. Cl.
CPC ............ *G06F 3/165* (2013.01); *G06F 3/16* (2013.01); *G06F 3/162* (2013.01);
(Continued)

(58) Field of Classification Search
CPC ..... G10L 19/003; G10L 19/167; G06F 3/165; H04H 60/04; H04H 60/73; H04H 60/58;
(Continued)

(56) References Cited

U.S. PATENT DOCUMENTS

| | | |
|---|---|---|
| 4,995,778 A | 2/1991 | Bruessel |
| 5,218,710 A | 6/1993 | Yamaki et al. |

(Continued)

FOREIGN PATENT DOCUMENTS

| | | |
|---|---|---|
| EP | 1133896 B1 | 8/2002 |
| EP | 1389853 A1 | 2/2004 |

(Continued)

OTHER PUBLICATIONS

"Denon 2003-2004 Product Catalog," Denon, 2003-2004, 44 pages.
(Continued)

*Primary Examiner* — Andrew C Flanders
(74) *Attorney, Agent, or Firm* — McDonnell Boehnen Hulbert & Berghoff LLP

(57) ABSTRACT

Techniques are provided for a playback device to play a media item using an audio setting corresponding to the media item and characteristics of the playback device. An example implementation involves a first playback device transmitting, to a first computing device, information indicating one or more characteristics of the first playback device and queue information indicating one or more media items in a playback queue to be played by the first playback device. The example implementation may further involve receiving, from the first computing device, one or more audio settings associated with the one or more media items, the one or more audio settings corresponding to the one or more media items and the one or more characteristics of the first playback device and playing a first media item of the one or more media items according to a first audio setting of the one or more audio settings.

18 Claims, 4 Drawing Sheets

(51) Int. Cl.
*G06F 17/30* (2006.01)
*G11B 27/10* (2006.01)
*G11B 27/34* (2006.01)
*H04R 3/12* (2006.01)
*H04R 27/00* (2006.01)

(52) U.S. Cl.
CPC ...... *G06F 17/30772* (2013.01); *G11B 27/105* (2013.01); *G11B 27/34* (2013.01); *H04R 3/12* (2013.01); *H04R 27/00* (2013.01); *H04R 2227/005* (2013.01)

(58) Field of Classification Search
CPC .... G10H 2240/016; H04R 3/13; H04S 7/308; H04S 2400/11; H04S 2400/15
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,910,991 A | 6/1999 | Farrar |
| 5,923,902 A | 7/1999 | Inagaki |
| 6,032,202 A | 2/2000 | Lea et al. |
| 6,256,554 B1 | 7/2001 | Dilorenzo |
| 6,345,279 B1* | 2/2002 | Li ................... G06F 17/30905 |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,704,421 B1 | 3/2004 | Kitamura |
| 6,757,517 B2 | 6/2004 | Chang |
| 6,778,869 B2 | 8/2004 | Champion |
| 7,072,477 B1 | 7/2006 | Kincaid |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,483,538 B2 | 1/2009 | McCarty et al. |
| 7,490,044 B2 | 2/2009 | Kulkarni |
| 7,519,188 B2 | 4/2009 | Berardi et al. |
| 7,571,014 B1 | 8/2009 | Lambourne et al. |
| 7,630,500 B1 | 12/2009 | Beckman et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,063,698 B2 | 11/2011 | Howard |
| 8,103,009 B2 | 1/2012 | McCarty et al. |
| 8,139,774 B2 | 3/2012 | Berardi et al. |
| 8,160,281 B2 | 4/2012 | Kim et al. |
| 8,175,292 B2 | 5/2012 | Aylward et al. |
| 8,229,125 B2 | 7/2012 | Short |
| 8,233,632 B1 | 7/2012 | MacDonald et al. |
| 8,234,395 B2 | 7/2012 | Millington et al. |
| 8,238,578 B2 | 8/2012 | Aylward |
| 8,243,961 B1 | 8/2012 | Morrill |
| 8,265,310 B2 | 9/2012 | Berardi et al. |
| 8,290,185 B2 | 10/2012 | Kim |
| 8,306,235 B2 | 11/2012 | Mahowald |
| 8,325,935 B2 | 12/2012 | Rutschman |
| 8,331,585 B2 | 12/2012 | Hagen et al. |
| 8,391,501 B2 | 3/2013 | Khawand et al. |
| 8,452,020 B2 | 5/2013 | Gregg et al. |
| 8,483,853 B1 | 7/2013 | Lambourne |
| 8,577,045 B2 | 11/2013 | Gibbs |
| 8,600,075 B2 | 12/2013 | Lim |
| 8,620,006 B2 | 12/2013 | Berardi et al. |
| 8,855,319 B2 | 10/2014 | Liu et al. |
| 8,879,761 B2 | 11/2014 | Johnson et al. |
| 8,914,559 B2 | 12/2014 | Kalayjian et al. |
| 8,934,647 B2 | 1/2015 | Joyce et al. |
| 8,934,655 B2 | 1/2015 | Breen et al. |
| 8,965,546 B2 | 2/2015 | Visser et al. |
| 8,977,974 B2 | 3/2015 | Kraut |
| 8,984,442 B2 | 3/2015 | Pirnack et al. |
| 9,020,153 B2 | 4/2015 | Britt, Jr. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2004/0237750 A1 | 12/2004 | Smith et al. |
| 2005/0157885 A1 | 7/2005 | Olney et al. |
| 2005/0240395 A1* | 10/2005 | Wiser ............... G11B 20/10527 704/201 |
| 2007/0142944 A1 | 6/2007 | Goldberg et al. |
| 2008/0002839 A1 | 1/2008 | Eng |
| 2008/0098027 A1 | 4/2008 | Aarts |
| 2008/0175411 A1 | 7/2008 | Greve |
| 2009/0024662 A1 | 1/2009 | Park et al. |
| 2009/0047993 A1 | 2/2009 | Vasa |
| 2009/0170532 A1 | 7/2009 | Lee et al. |
| 2009/0290725 A1* | 11/2009 | Huang ................... H03G 5/165 381/103 |
| 2010/0013855 A1 | 1/2010 | Allen et al. |
| 2010/0076577 A1 | 3/2010 | Lee et al. |
| 2010/0142735 A1 | 6/2010 | Yoon et al. |
| 2011/0040395 A1 | 2/2011 | Kraemer et al. |
| 2011/0170710 A1 | 7/2011 | Son |
| 2012/0051558 A1 | 3/2012 | Kim et al. |
| 2012/0057078 A1* | 3/2012 | Fincham ................. H04N 5/57 348/645 |
| 2012/0127831 A1 | 5/2012 | Gicklhorn et al. |
| 2012/0263325 A1 | 10/2012 | Freeman et al. |
| 2012/0274459 A1 | 11/2012 | Jaisimha et al. |
| 2013/0010970 A1 | 1/2013 | Hegarty et al. |
| 2013/0022221 A1 | 1/2013 | Kallai et al. |
| 2013/0028443 A1 | 1/2013 | Pance et al. |
| 2013/0259254 A1 | 10/2013 | Xiang et al. |
| 2014/0003623 A1 | 1/2014 | Lang |
| 2014/0016784 A1 | 1/2014 | Sen et al. |
| 2014/0016786 A1 | 1/2014 | Sen |
| 2014/0016802 A1 | 1/2014 | Sen |
| 2014/0023196 A1 | 1/2014 | Xiang et al. |
| 2014/0112481 A1 | 4/2014 | Li et al. |
| 2014/0112484 A1* | 4/2014 | Britt, Jr. ................. H04R 29/001 381/59 |
| 2014/0161285 A1* | 6/2014 | Oh ........................ G10L 19/008 381/107 |
| 2014/0181158 A1 | 6/2014 | Herz et al. |
| 2014/0184734 A1 | 7/2014 | Nakagawa |
| 2014/0219456 A1 | 8/2014 | Morrell et al. |
| 2014/0226823 A1 | 8/2014 | Sen et al. |
| 2014/0294200 A1 | 10/2014 | Baumgarte et al. |
| 2014/0355768 A1 | 12/2014 | Sen et al. |
| 2014/0355794 A1 | 12/2014 | Morrell et al. |
| 2015/0063610 A1 | 3/2015 | Mossner |
| 2015/0146886 A1 | 5/2015 | Baumgarte |
| 2015/0201274 A1 | 7/2015 | Ellner et al. |
| 2015/0281866 A1 | 10/2015 | Williams et al. |

FOREIGN PATENT DOCUMENTS

| | | |
|---|---|---|
| EP | 1825713 B1 | 10/2012 |
| EP | 2860992 A1 | 4/2015 |
| WO | 200153994 | 7/2001 |
| WO | 2003093950 A2 | 11/2003 |
| WO | 2015024881 A1 | 2/2015 |

OTHER PUBLICATIONS

U.S. Appl. No. 60/490,768, filed Jul. 28, 2003, entitled "Method for synchronizing audio playback between multiple networked devices," 13 pages.

(56) References Cited

OTHER PUBLICATIONS

U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Oct. 19, 2015, issued in connection with U.S. Appl. No. 14/337,770, filed Jul. 22, 2014, 11 pages.
Notice of Allowance dated Feb. 29, 2016, issued in connection with U.S. Appl. No. 14/337,770, filed Jul. 22, 2014, 5 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.
International Searching Authority, International Search Report and Written Opinion dated Nov. 5, 2015, issued in connection with International Application No. PCT/US2015/041504, filed on Jul. 22, 2015, 11 pages.
European Patent Office, European Search Report dated Sep. 29, 2017, issued in connection with EP Application No. 15824061.4, 7 pages.
International Searching Authority, International Preliminary Report on Patentability dated Feb. 2, 2017, issued in connection with International Application No. PCT/US2015/041504, filed on Jul. 22, 2015, 8 pages.

\* cited by examiner

AUDIO SETTINGS

CROSS REFERENCE TO RELATED APPLICATIONS

This application claims priority under 35 U.S.C. § 120 to, and is a continuation of, U.S. non-provisional patent application Ser. No. 14/337,770, filed on Jul. 22, 2014, entitled "Audio Settings," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from a plethora of sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
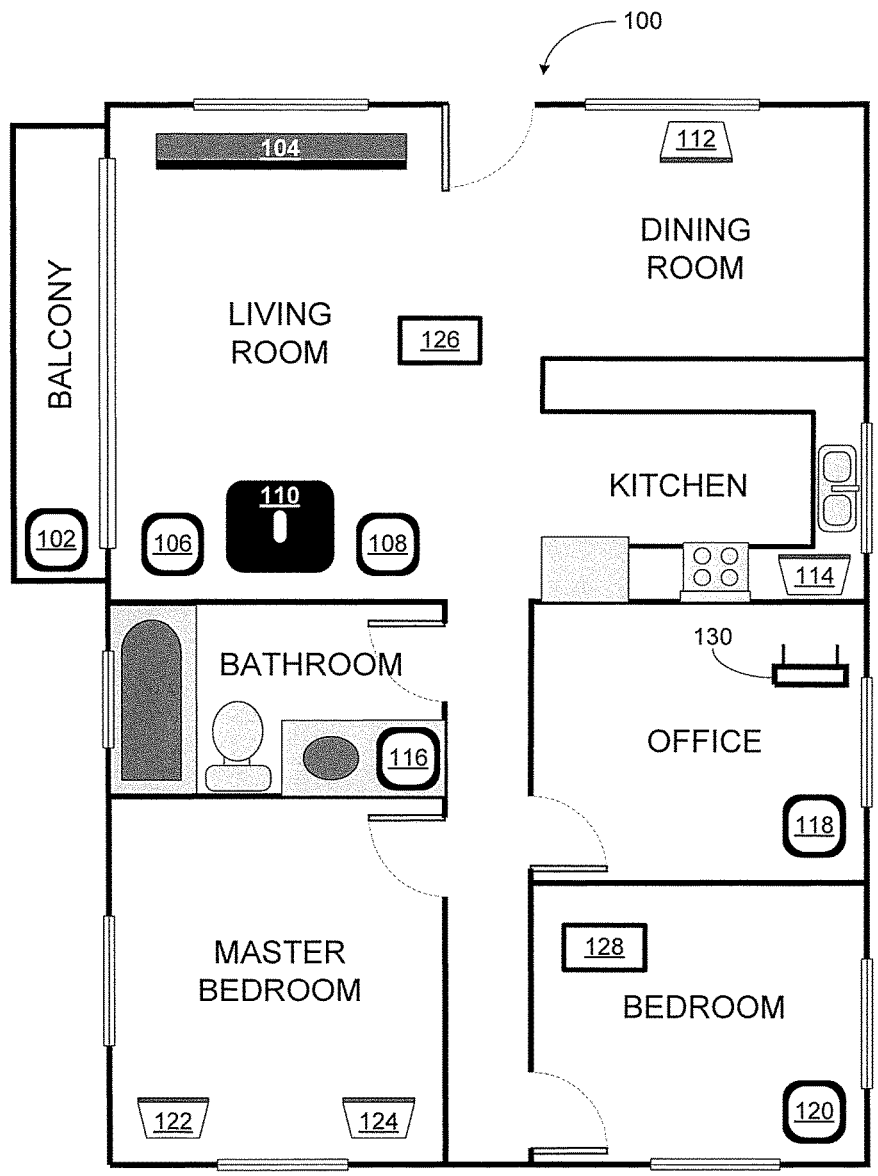
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

During production of an audio track, an artist may adjust, according to his or her preferences, audio settings of the audio track while listening to the audio track being played by a particular playback device or group of playback devices. However, due to differences in characteristics of different playback devices, the audio track may sound different when played by playback devices that are different from the particular playback device or group of playback devices used by the artist.

In one instance, the artist of the audio track may set, for each of a plurality of different playback device models, one or more audio settings corresponding to different playback configurations of a respective playback device model. The different playback configurations of the respective playback device model may include configurations for groups of playback devices, including the respective playback device model.

While the discussions above refer to audio settings provided by an artist of the media item, one having ordinary skill in the art will appreciate that other providers of the media item, such as a producer associated with the media item, a curator of a playlist that includes the media item, or a sound engineer involved with the production of the media item and/or the playback device, among others, may also provide audio settings for the media item. Such audio settings may be referred to hereafter as "provider audio settings."

Some examples described herein involve a playback device playing a media item according to a provider audio setting that correspond to the media item and one or more characteristics of the playback device. The one or more characteristics of the playback device may include, among others, a model of the playback device and a configuration of the playback device. The audio settings may include one or more of equalization settings, phase settings, and volume settings, among other possible audio playback parameters. As such, the playback device may play the media item according to an audio setting for the media item that was specifically set by the provider for the model and configuration of playback device. Accordingly, the media item, as played by the playback device may sound substantially as the provider intended.

In one example, a playback device in a media playback system may receive data indicating that a media item is to be played by the playback device. In response to receiving the data, the playback device may identify an audio setting that corresponds to the media item and the one or more characteristics of the playback device.

Upon identifying the audio setting, the playback device may play the media item according to the identified audio playback setting. In one example, metadata associated with the media item may include parameters for each audio setting available for the media item, and the playback device may accordingly retrieve the parameters for the identified audio playback setting from the metadata. In another example, metadata associated with the media item may identify a location (i.e. uniform resource locator, or "URL") where parameters for available audio settings for the media item are stored. The playback device may accordingly access the parameters for the identified audio setting from the URL. In a further example, data indicating parameters for the identified audio setting may be embedded in audio data associated with the media item. Other examples are possible.

In one example, the playback device may be part of a group of playback devices configured to play the media item in synchrony (i.e. a zone group or bonded zone), and may be a group coordinator of the group. In one instance, the playback device may relay to each playback device in the group, audio data to be played by each respective playback device in the group. In this instance, each playback device in the group may individually determine a respective audio setting according to which the respective playback device is to play the audio data.

In another instance, the playback device, as the group coordinator, may, for each playback device in the group, identify an audio setting for the respective playback device, and transmit, along with audio data to be rendered by the respective playback device, the identified audio setting to the respective playback device for the respective playback devices to apply when playing the audio data.

In a further instance, the playback device, as the group coordinator, may, for each playback device in the group, identify an audio setting for the respective playback, modify the audio data to be played by the respective playback device by applying the identified audio setting to the audio, and transmitting the modified audio data to the respective playback device for the respective playback device to render. Other examples are also possible.

As indicated above, the present discussions involve a playback device playing a media item using an audio setting that corresponds to the media item and characteristics of the playback device playing the media item. In an embodiment, a method is provided. The method involves receiving, by a computing device, data indicating that a media item is to be played by a playback device, identifying, by the computing device, an audio setting that corresponds to (i) the media item and (ii) one or more characteristics of the playback device, and causing, by the computing device, the playback device to play the media item according to the identified audio setting.

In another embodiment, a playback device is provided. The playback device includes a processor and memory having stored thereon instructions executable by the processor to cause the playback device to perform functions. The functions include receiving data indicating that a media item is to be played by the playback device, identifying an audio setting that corresponds to (i) the media item and (ii) one or more characteristics of the playback device, and causing the playback device to play the media item according to the identified audio setting.

In yet another embodiment, a non-transitory computer readable memory is provided. The non-transitory computer readable memory has stored thereon instructions executable by a computing device to cause the computing device to perform functions. The functions include receiving data indicating that a media item is to be played by a playback device, identifying an audio setting that corresponds to (i) the media item and (ii) one or more characteristics of the playback device, and causing the playback device to play the media item according to the identified audio setting.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
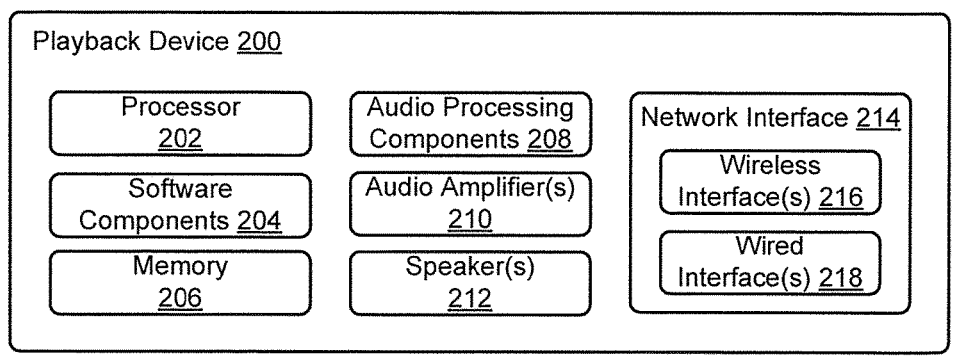
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
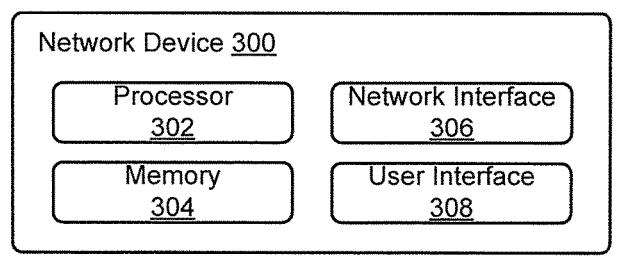
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
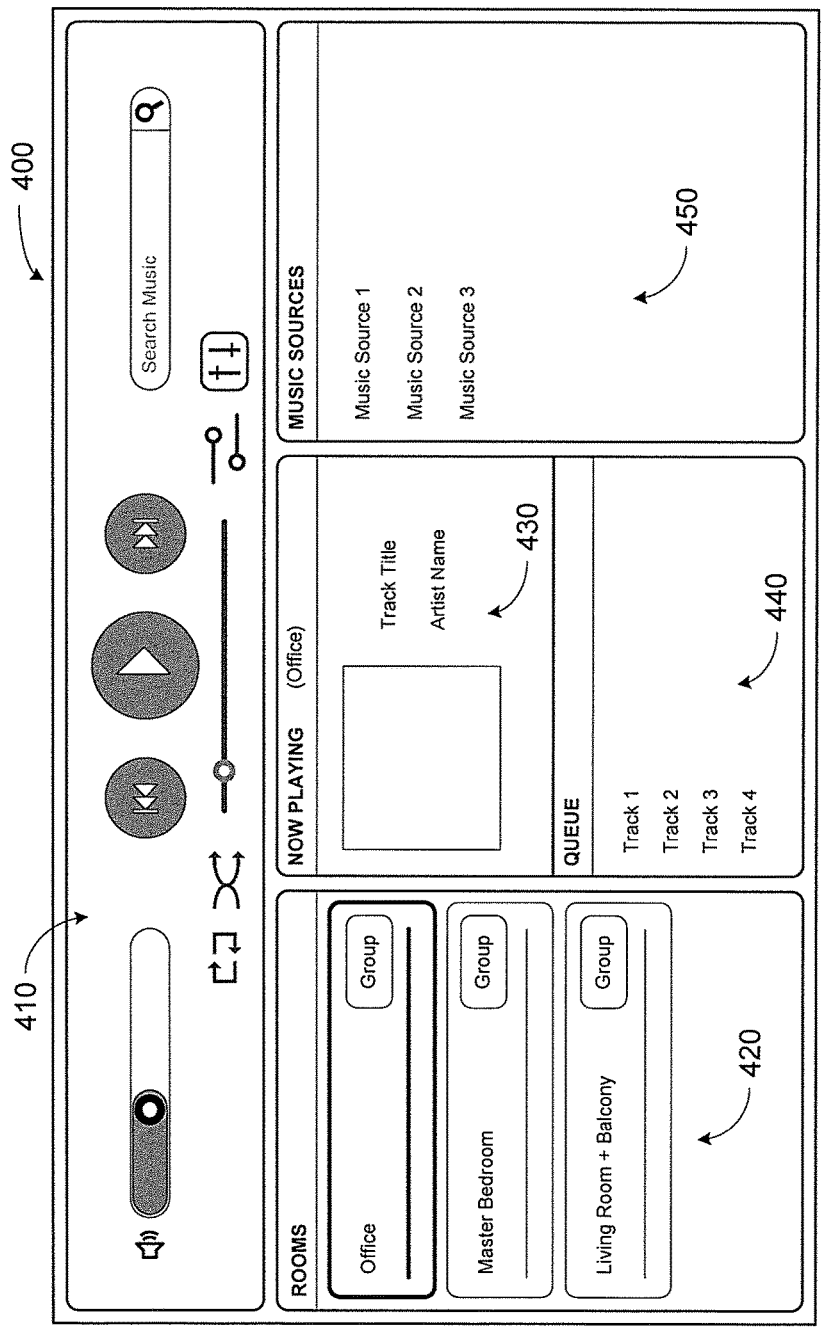
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

Figure 5:
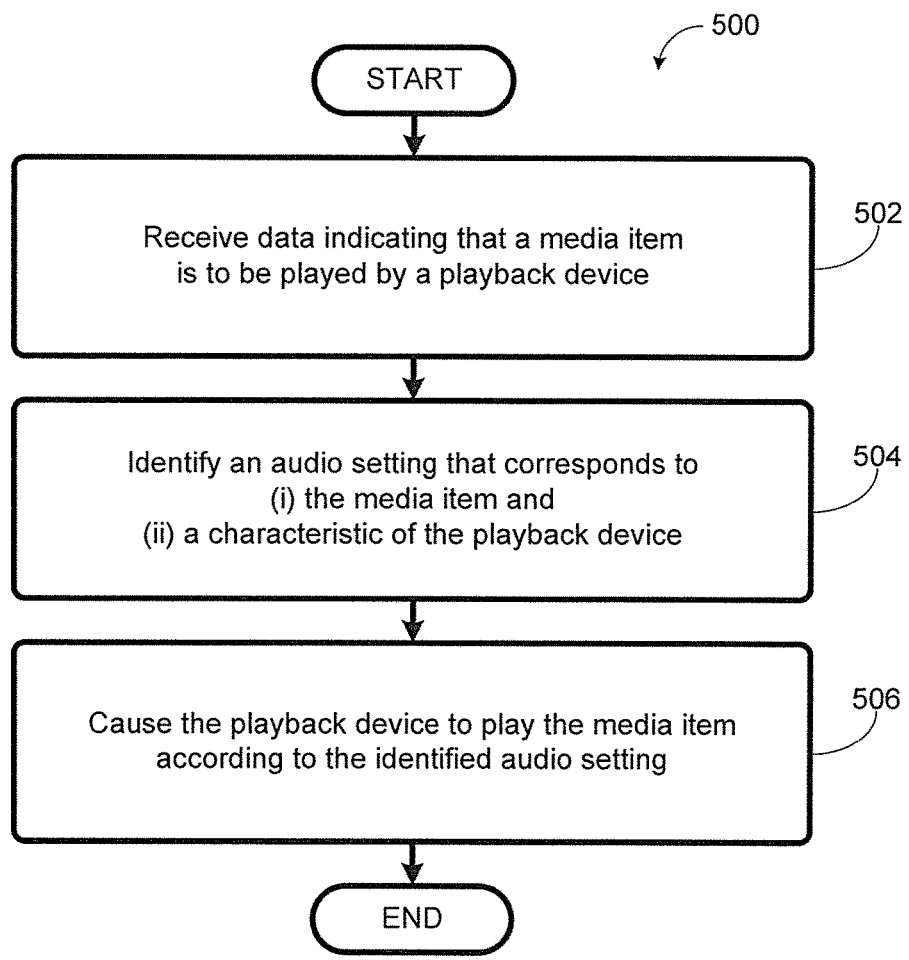
FIG. 5 shows an example flow diagram for playing a media item according to an identified audio setting.

III. Example Methods for Media Playback According to Identified Audio Settings As mentioned above, embodiments described herein involve a playback device playing a media item using an audio setting corresponding to the media item and one or more characteristics of the playback device. Method 500 shown in FIG. 5 presents an embodiment that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-506. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

As shown in FIG. 5, block 502 of the method 500 involves receiving data indicating that a media item is to be played by a playback device, block 504 of the method 500 involves identifying an audio setting that corresponds to (i) the media item and (ii) a one or more characteristics of the playback device, and block 506 of the method 500 involves causing the playback device to play the media item according to the identified audio setting.

As indicated above, the method 500 may be performed by a computing device such as a playback system in the media playback system, a controller device for the media playback system, or a server associated with the media playback system. In one case, the computing device may be the playback device that is to play the media item. In one instance, the computing device may be a group coordinator of a group of playback devices that is to play the media item. In this instance, the computing device may be configured to receive data indicating the media item to be played by the playback devices in the group, and coordinating playback of the media item by the playback devices in the group.

a. Receive Data Indicating that a Media Item is to be Played by a Playback Device At block 502, the method 500 involves receiving data indicating that a media item is to be played by a playback device. The media item may be a media item from a local music library or a media item provided by a service provider. In one example, the media item may be identified in a playback queue associated with a playback zone that includes the playback device. In one case, the media item may have been individually added to the playback queue. In another case, the media item may be part of an album or a playlist that was added to the playback queue.

The playback device may be a device similar to that discussed above in sections II.a-II.d. As such, the playback device may be configured to play media content from a variety of sources, including the local music library or service provider providing the media item. The playback device may be one of a variety of models of playback devices. In one example, the playback device may be of a model that has three transducers. In another example, the playback device may be of a model that has five transducers. Other examples are also possible.

In discussions herein, different playback devices may produce audio outputs having different characteristics, including different frequency responses, different frequency ranges, and different volume ranges, among other examples. Playback devices of the same model may produce audio outputs having substantially the same frequency response, frequency range, and volume range.

In one case, the media item is only to be played by the playback device. In another case, the media item is to be played by the playback device in synchrony with one or more other playback devices. For instance, the playback device may be configured as one device in a stereo configuration of two playback devices. In another instance, the playback device may be configured as one of a center, left, right, left-rear, or right-rear device in a home theater configuration of multiple playback devices. Other such examples may exist.

In a further case, the playback device may be configured to play the media item while positioned in one of multiple placement orientations. For instance, if the playback device is a rectangular device, a first orientation may be a horizontal positioning of the playback device, while a second orientation may be a vertical positioning of the playback device. The playback device may produce different audio output frequency responses when positioned in the different orientations. Other examples are also possible.

Referring back to block 502, the data indicating that the media item is to be played by the playback device may be received when playback of a playback queue including the media item has progressed to the media item. In another example, the data may be received when playback of the playback queue has progressed to another media item before the media item. For instance, the data may be cached in anticipation of being subsequently played back. In a further example, the data indicating that the media item is to be played by the playback device may be received when the media item is added to the playback queue. Other examples are also possible.

In one example, the computing device may receive the data from a second device that is in the media playback system. In one case, if the computing device is a playback device, the second device may be a controller device, a server associated with the media playback system, or a second playback device in the media playback system. In another case, if the computing device is a controller device, the second device may be a playback device, a server associated with the media playback system, or a second controller device. In a further case, if the computing device is a server associated with the media playback system, the second device may be a controller device, a playback device, or a second server associated with the media playback system. In some cases, a server associated with the media playback system may be a server for a service provider from which the media playback system may receive and play media content. Other examples are also possible.

b. Identify an Audio Setting

At block 504, the method 500 involves identifying an audio setting that corresponds to (i) the media item and (ii) one or more characteristics of the playback device. The audio settings may include one or more of equalization settings, phase settings, and volume settings, among other possible audio playback parameters. Characteristics of the playback device may include, among other possibilities, a model of the playback device, a playback orientation of the playback device, and a playback group configuration of the playback device, as discussed above. Characteristics of the playback device may further include an age (and/or production year) of the playback device, a usage history (i.e. number of hours played) of the playback device, or a operational environment (i.e. indoors or outdoors) of the playback device, among other possibilities. The model of the playback device may also include a version, type, or name of the playback device, among other possibilities.

As indicated previously, a provider (such as an artist, producer, or curator, among others) of an audio track may determine an audio setting specifically for the media item and the characteristics of the playback device. In one case, the provider may determine, for each possible combination of the one or more characteristics of the playback device, a different audio setting based on what the provider believes provides the optimal listening experience of the media item when the media item is rendered by the playback device having the respective one or more characteristics. As such, a plurality of audio settings may be available for the media item.

For instance, the provider may determine for optimal experience of the media item, a first audio setting for a particular model of playback devices while the particular model is a left channel speaker of a stereo configuration, and positioned in a vertical orientation, and a second audio setting for the particular model of playback devices while the particular model is in a stand-alone configuration, and positioned in a horizontal orientation. Other examples are also possible.

In some cases, given a particular one or more characteristics of the playback device, a respective audio setting corresponding to a media item may also correspond to one or more other media items. For instance, a particular audio setting may correspond to one or more media items in a music album that includes the media item. In another instance, a particular audio setting may correspond to all media items created by a particular artist, producer, or record label, among others. As such, in one example, the respective audio setting corresponding to the particular one or more characteristics of a playback device may be used by the playback device when playing any one of the plurality of media items in the album or collection.

Similarly in some cases, one of a plurality of audio settings corresponding to one or more characteristics of the playback device may correspond to a genre of the media item. For instance, a curator of a playlist may provide for a particular playback device (or group of playback devices) a first audio setting for a first genre of media items in one or more curated playlist, and provide a second audio setting for a second genre of media items in the one or more curated playlists. In another instance, the curator of a playlist may provide for the particular playback device (or group of playback devices), a particular audio setting to be applied to all media items by a particular artist, producer, and or record label, among others. Other examples are also possible.

Further, while discussions herein generally involve audio settings corresponding to at least one or more characteristics of the playback device, some cases may involve audio settings provided for media items or groups of media items, independent of the one or more characteristics of the playback device (or groups of playback devices). In one case, an audio setting for one or more media items in a curated playlist may be provided by a curator of the playlist, independent of any characteristics of a playback device that may play the one or more media items. For instance, the curator of the playlist may prefer more bass content, and may accordingly provide for one or more media items in the curated playlist, an audio setting having higher gain in the lower frequencies. Other examples are also possible.

As indicated above, the provider may be one or more of an artist of the media item, a producer associated with the media item, and a curator of a playlist that includes the media item, among others.

In one example, the determined audio setting may be a static setting such that a consistent audio setting is determined for the entire duration of the media item. In another example, the determined audio setting may be a dynamic setting that changes over the duration of the media item. For instance, the determined audio setting may include an equalization setting of higher gain in lower frequencies during the first half of the duration of the media item, and lower gain in the lower frequencies during the second half of the duration of the media item. Other examples are also possible.

In one example, parameters corresponding to each audio setting that corresponds to the media item may be stored in association with the one or more characteristics of the playback device. In one case, the parameters corresponding to each audio settings may be stored as part of metadata for the media item. In another instance, the parameter corresponding to each audio setting may be stored on a server, and the metadata for the media item may identify a uniform resource locator (URL) for where the parameters are stored. Other examples are also possible.

In one example, identifying the audio setting may involve identifying the one or more characteristics of the playback device. In one case, if the computing device is the playback device that is to play the media content, the computing device may retrieve from memory storage and/or sensors on the computing device, information indicating the one or more characteristics of the playback device. For instance, a model number of the playback device may be locally stored, and an orientation of the playback device may be determined based on one or more sensors on the playback device.

In another case, if the computing device is a controller device or a server associated with the media playback system, the data indicating that the media item is to be played by the playback device may further indicate the one or more characteristics of the playback device. In this case, the computing device may receive data indicating the one or more characteristics of the playback device from another device in the media playback system, such as the playback device that is to play the media item, another playback device in the media playback system, a controller device, or a server associated with the media playback system. In one instance, the data indicating the one or more characteristics of the playback device may be received in response to a request by the computing device for information on the playback device that is to play the media item.

Upon identifying the one or more characteristics of the playback device, the computing device may identify among available audio settings, the audio setting corresponding to the media item and the one or more characteristics of the playback device.

In one example, parameters for only an audio setting that corresponds to the media item and the one or more characteristics of the playback device may be stored or provided in the metadata for the media item when the computing device receives the metadata. For instance, a server such as a service provider or a server associated with the media playback system that is providing the metadata to the computing device may identify the one or more characteristics of the playback device, and determine a particular audio setting that corresponds to the media item and the one or more characteristics of the playback device. As such, the server may modify the metadata for the media item to indicate parameters for only the particular audio setting. In such a case, identifying the audio setting corresponding to the media item and the one or more characteristics of the playback device may involve the playback device parsing the metadata to receive the parameters for the particular audio setting.

In some cases, more than one audio setting may correspond to the media item and the one or more characteristics of the playback device. For instance, as discussed above, a first audio setting corresponding to the media item and the one or more characteristics of the playback device may be determined by a provider of the media item, and a second audio setting corresponding to the media item and the one or more characteristics of the playback device may be determined by a curator of a curated playlist that includes the media item.

In one case, the computing device may prompt a user who added the media item to the playback queue (or otherwise provided a command to cause the playback device to play the media item) to select from the more than audio setting options. In another case, the audio setting may be selected based on a context from which the media item is to be played by the playback device. For example, the second audio setting may be selected if the media item was added to the playback queue when the curated playlist was added to the playback queue, or if the media item was selected for playback from the curated playlist, while the first audio setting may otherwise be selected. Other examples are also possible.

c. Cause the Playback Device to Play the Media Item According to the Identified Audio Setting Upon identifying the audio setting, the method 500, at block 506, involves causing the playback device to play the media item according to the identified audio setting.

In one example, the computing device may receive metadata associated with the media item that is to be played by the playback device. In one case, the metadata may be received along with, or as a part of the data indicating that the media item is to be played by the playback device that was received at block 502. In another case, the computing device may receive the metadata separately, and/or from another device associated with the media playback system. In one instance, the metadata may be received in response to a request for the metadata by the computing device.

As discussed above, in one case, the metadata may include parameters for the identified audio setting. In some instances, the metadata may include parameters for all available audio settings corresponding to the media item, including the identified audio setting. In another case, as discussed above the metadata may identify a URL where parameters for the available audio settings are stored. In such a case, the computing device may access the URL to receive parameters for the identified audio setting.

In another example, parameters or URLs to the parameters for the playback equalization settings may be embedded and/or encoded within the audio data of the media item. In one case, the playback device may access the parameters for the identified playback equalization setting (either directly or via a URL) when the playback device decodes the audio data for playback. Other examples are also possible.

In either case, if the computing device is the playback device that is to play the media content, the computing device may apply the parameters for the identified audio setting when playing the media item.

As indicated above, the computing device may be one of a group of playback devices that is to play the media item in synchrony (i.e. a zone group or bonded zone), and in one case, may be a group coordinator of the group. In one instance, the computing device, as the group coordinator, may relay to each of the other playback devices in the group, audio data to be played by each respective playback device in the group. In this instance, each playback device in the group, including the group coordinator, may individually determine a respective audio setting according to which the respective playback device is to play the audio data.

In another instance, the computing device, as the group coordinator, may, for each playback device in the group, identify an audio setting for the respective playback device, and transmit, along with audio data to be rendered by the respective playback device, the identified audio setting to the respective playback device for the respective playback devices to apply when playing the audio data. In this instance, the group coordinator may effectively transmit to itself an audio setting identified for the group coordinator to apply when playing the media content.

In a further instance, the computing device, as the group coordinator, may, for each playback device in the group, identify an audio setting for the respective playback, modify the audio data to be played by the respective playback device by applying the identified audio setting to the audio data, and transmitting the modified audio data to the respective playback device for the respective playback device to render.

In another example, the computing device may not be a playback device that is to play the media item. For instance, as indicated above, the computing device may be a controller device or a server associated with the media playback system. In one case, causing the playback device to play the media item according to the identified audio setting may involve generating modified audio data by applying the parameters for the identified audio setting to the audio data for the media item to be played by the playback device, and sending the modified audio data to the playback device for the playback device to play. Alternatively, the computing device may transmit the parameters for the identified audio setting to the playback device that is to play the media item, and the playback device may apply the parameters to the audio data for the media item when the playback device plays the media item.

In another case, if the media item is to be played by a group of playback devices, the computing device may transmit to a group coordinator of the group of playback devices, identified audio settings corresponding to each playback device in the group. The group coordinator may then process and distribute the identified audio settings as described above.

In a further case, the computing device may individually transmit to each playback device in the group, an identified audio setting that corresponds to each respective playback device in the group. Other examples are also possible.

As described in the examples above, one or more playback devices in a media playback system may play, either individually as in synchrony as a group, the media item according to an identified provider audio setting that corresponds to the media item and one or more characteristics of the playback devices, thereby rendering the media item as intended by the provider of the media item. Other examples are also possible.

IV. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A method comprising:
   transmitting, via a playback device over one or more networks to a first computing device, information indicating one or more characteristics of the playback device;
   transmitting, via the playback device over the one or more networks to the first computing device, queue information indicating a first media item from a plurality of media items in a playback queue to be played by the playback device, wherein the playback queue is stored in memory on the playback device, wherein the first media item is retrievable for playback by the playback device from a second computing device that is physically different from the first computing device, and wherein the queue information is transmitted in response to determining that playback of the playback queue has progressed to another media item before the first media item;
   after transmitting the queue information, receiving, via the playback device over the one or more networks from the first computing device, one or more audio settings associated with the first media item, the one or more audio settings corresponding to the first media item and the one or more characteristics of the playback device; and
   playing, via the playback device, the first media item according to a first audio setting of the one or more audio settings.

2. The method of claim 1, further comprising:
   modifying, via the playback device, audio data of the first media item based on the first audio setting, and
   wherein playing the first media item comprises:
      playing, via the playback device, the modified audio data of the first media item.

3. The method of claim 1, wherein transmitting the queue information comprises:
in response to determining that the first media item is to be played next, transmitting a request for audio settings for the first media item.

4. The method of claim 1, wherein the playback device is a first playback device, and wherein a group comprises the first playback device and a second playback device, and
wherein receiving the one or more audio settings associated with the first media item comprises:
receiving the first audio setting to be applied during playback of the first media item by the first playback device; and
receiving a second audio setting associated with the first media item to be applied during playback of the first media item by the second playback device.

5. The method of claim 4, wherein the first audio setting is different from the second audio setting.

6. The method of claim 4, further comprising:
transmitting, via the playback device to the second playback device, the second audio setting and the first media item.

7. The method of claim 4, further comprising:
generating, via the first playback device, a first modified audio data by modifying audio data of the first media item based on the first audio setting;
generating, via the first playback device, a second modified audio data by modifying the audio data of the first media item based on the second audio setting; and
transmitting, via the first playback device to the second playback device, the second modified audio data.

8. The method of claim 7, further comprising:
causing, via the first playback device, the second playback device to play the second modified audio data synchronously with playback by the first playback device of the first modified audio data.

9. A tangible, non-transitory computer-readable medium storing instructions that when executed by a playback device cause the playback device to perform functions comprising:
transmitting, over one or more networks to a first computing device, information indicating one or more characteristics of the playback device;
transmitting, over the one or more networks to the first computing device, queue information indicating a first media item from a plurality of media items in a playback queue to be played by the playback device, wherein the playback queue is stored in memory on the playback device, and wherein the first media item is retrievable for playback by the playback device from a second computing device that is physically different from the first computing device, and wherein the queue information is transmitted in response to determining that playback of the playback queue has progressed to another media item before the first media item;
after transmitting the queue information, receiving, over the one or more networks from the first computing device, one or more audio settings associated with the first media item, the one or more audio settings corresponding to the first media item and the one or more characteristics of the playback device; and
playing the first media item according to a first audio setting of the one or more audio settings.

10. The tangible, non-transitory computer-readable medium of claim 9, wherein the functions further comprise:
modifying, via the playback device, audio data of the first media item based on the first audio setting, and
wherein playing the first media item comprises:
playing, via the playback device, the modified audio data of the first media item.

11. The tangible, non-transitory computer-readable medium of claim 9, wherein transmitting the queue information comprises:
in response to determining that the first media item is to be played next, transmitting a request for audio settings for the first media item.

12. The tangible, non-transitory computer-readable medium of claim 9, wherein the playback device is a first playback device, and wherein a group comprises the first playback device and a second playback device, and
wherein receiving the one or more audio settings associated with the first media item comprises:
receiving the first audio setting to be applied during playback of the first media item by the first playback device; and
receiving a second audio setting associated with the first media item to be applied during playback of the first media item by the second playback device.

13. The tangible, non-transitory computer-readable medium of claim 12, wherein the first audio setting is different from the second audio setting.

14. The tangible, non-transitory computer-readable medium of claim 12, wherein the functions further comprise:
transmitting, to the second playback device, the second audio setting and the first media item.

15. The tangible, non-transitory computer-readable medium of claim 12, wherein the functions further comprise:
generating a first modified audio data by modifying audio data of the first media item based on the first audio setting;
generating a second modified audio data by modifying the audio data of the first media item based on the second audio setting; and
transmitting, to the second playback device, the second modified audio data.

16. A playback device, comprising:
a processor; and
memory storing instructions that when executed by the processor cause the playback device to perform functions comprising:
transmitting, over one or more networks to a first computing device, information indicating one or more characteristics of the playback device;
transmitting, over the one or more networks to the first computing device, queue information indicating a first media item from a plurality of media items in a playback queue to be played by the playback device, wherein the playback queue is stored in memory on the playback device, and wherein the first media item retrievable for playback by the playback device from a second computing device different from the first computing device, and wherein the queue information is transmitted in response to determining that playback of the playback queue has progressed to another media item before the first media item;
after transmitting the queue information, receiving, over the one or more networks from the first computing device, one or more audio settings associated with the first media item, the one or more audio settings corresponding to the first media item and the one or more characteristics of the playback device; and
playing the first media item according to a first audio setting of the one or more audio settings.

17. The playback device of claim 16, wherein the functions further comprise:
  receiving, via the playback device, an instruction to add the first media item to the playback queue; and
  in response to receiving the instruction, transmitting a request for audio settings for the first media item.

18. The playback device of claim 16, wherein the playback device is a first playback device, and wherein a group comprises two or more playback devices comprising the first playback device and a second playback device, and
  wherein receiving the one or more audio settings associated with the first media item comprises:
    receiving the first audio setting to be applied during playback of the first media item by the first playback device; and
    receiving a second audio setting associated with the first media item to be applied during playback of the first media item by the second playback device.

\* \* \* \* \*